United States Patent
Gontmakher et al.

(10) Patent No.: US 8,645,050 B2
(45) Date of Patent: Feb. 4, 2014

(54) TRANSPORTATION INFORMATION SYSTEMS AND METHODS ASSOCIATED WITH DEGRADATION MODES

(75) Inventors: Alex Gontmakher, Ness Ziona (IL); Frederick Peter Brewin, Canton Zurich (CH); Noam Ben Haim, Adliswil (CH)

(73) Assignee: Google Inc., Mountain View, CA (US)

( * ) Notice: Subject to any disclaimer, the term of this patent is extended or adjusted under 35 U.S.C. 154(b) by 123 days.

(21) Appl. No.: 13/228,225

(22) Filed: Sep. 8, 2011

(65) Prior Publication Data

US 2012/0232776 A1    Sep. 13, 2012

Related U.S. Application Data

(60) Provisional application No. 61/381,361, filed on Sep. 9, 2010.

(51) Int. Cl.
*G06G 7/70* (2006.01)

(52) U.S. Cl.
USPC .............................. 701/117; 340/994; 701/400

(58) Field of Classification Search
USPC ................. 701/117, 400; 340/994, 992, 990; 248/430
See application file for complete search history.

(56) References Cited

U.S. PATENT DOCUMENTS

| | | | |
|---|---|---|---|
| 4,360,875 A | 11/1982 | Behnke | |
| 5,559,707 A | 9/1996 | DeLorme et al. | |
| 6,253,148 B1 | 6/2001 | Decaux et al. | |
| 6,424,910 B1 | 7/2002 | Ohler et al. | |
| 6,975,997 B1 | 12/2005 | Murakami et al. | |
| 7,027,995 B2 | 4/2006 | Kaufman et al. | |
| 7,080,019 B1 | 7/2006 | Hurzeler | |
| 7,920,967 B1 | 4/2011 | Harris et al. | |
| 8,090,707 B1 | 1/2012 | Orttung et al. | |
| 8,285,570 B2 | 10/2012 | Meyer et al. | |

(Continued)

FOREIGN PATENT DOCUMENTS

| | | |
|---|---|---|
| KR | 10-2009-0042573 | 0/4200 |
| KR | 10-2005-0093210 | 9/2005 |
| WO | WO 2009/065638 A1 | 5/2009 |

OTHER PUBLICATIONS

Barbeau, et al., "Integration of GPS-Enabled Mobile Phones and AVL: Personalized Real-Time Transit Navigation Information on Your Phone," Proceedings of the National Academy of Sciences, Transportation Research Board 89th Annual Meeting, Nov. 2009.

(Continued)

*Primary Examiner* — Thomas Black
*Assistant Examiner* — Shardul Patel
(74) *Attorney, Agent, or Firm* — McDermott Will & Emery LLP

(57) ABSTRACT

An exemplary method includes determining whether real-time vehicle location information deviates from at least one of historical real-time vehicle location information or scheduled vehicle location information. The exemplary method further includes generating a schedule degradation mode based on a deviation of real-time vehicle location information from at least one of historical real-time vehicle location information or scheduled vehicle location information. The exemplary method also includes generating first scheduling information for a user based on the user data and public transportation data when the deviation does not exceed a threshold. The exemplary method further includes generating second scheduling information, different from the first scheduling information, that includes an indication of the schedule degradation mode for the user based on user data, public transportation data, and the deviation when the deviation exceeds the threshold.

20 Claims, 13 Drawing Sheets

(56) References Cited

U.S. PATENT DOCUMENTS

| | | | |
|---|---|---|---|
| 2001/0056363 A1 | 12/2001 | Gantz et al. | |
| 2003/0100993 A1 | 5/2003 | Kirshenbaum et al. | |
| 2003/0177020 A1 | 9/2003 | Okamura | |
| 2004/0049424 A1 | 3/2004 | Murray et al. | |
| 2004/0073355 A1* | 4/2004 | Yates | 701/117 |
| 2004/0107028 A1* | 6/2004 | Catalano | 701/2 |
| 2005/0033614 A1 | 2/2005 | Lettovsky et al. | |
| 2006/0164259 A1* | 7/2006 | Winkler et al. | 340/944 |
| 2006/0189297 A1 | 8/2006 | Jung | |
| 2006/0276960 A1 | 12/2006 | Adamczyk et al. | |
| 2007/0106468 A1 | 5/2007 | Eichenbaum et al. | |
| 2008/0091342 A1 | 4/2008 | Assael | |
| 2010/0088026 A1 | 4/2010 | Manolescu | |
| 2010/0121662 A1 | 5/2010 | Becker | |
| 2010/0318285 A1* | 12/2010 | Kim et al. | 701/117 |
| 2012/0023033 A1* | 1/2012 | Tomasz | 705/345 |
| 2012/0290652 A1 | 11/2012 | Boskovic | |
| 2013/0041941 A1 | 2/2013 | Tomasic et al. | |

OTHER PUBLICATIONS

Ferris, et al., "OneBusAway: Results from Providing Real-Time Arrival Information for Public Transit," CHI2010: Bikes and Buses, pp. 1807-1816, ACM, 2010.

Peng, et al., "Design and development of interactive trip planning for web-based transit information systems," Transportation Research Part C, pp. 409-425, Elsevier Science Ltd., 2000.

Tumas, et al., "Personalized Mobile City Transport Advisory System," Information and Communication Technologies in Tourism 2009, pp. 173-183, Springer Link, 2009.

Patterson, et al., "Opportunity Knocks: A System to Provide Cognitive Assistance with Transportation Services," International Conference on Ubiquitous Computing, pp. 433-450, 2004.

Ferris, et al., "Location-Aware Tools for Improving Public Transit Usability," Pervasive Computing, pp. 2-9, IEEE CS, 2010.

Gidófalvi, et al., "Instant Social Ride-Sharing," Proceedings of the Fifteenth World Congress on Intelligent Transport Systems, Nov. 16-20, 2008, pp. 1-8, Intelligent Transportation Society of America, New York, NY, USA.

Gidófalvi, et al., "Cab-Sharing: An Effective, Door-To-Door, On-Demand Transportation Service," Proceedings of the $6^{th}$ European Congress on Intelligent Transport Systems and Services, Jun. 18-20, 2007, pp. 1-8, ERTICO, Aalborg, Denmark.

Garcia, et al., "Personalized Tourist Route Generation," Current Trends in Web Engineering, 2010, pp. I-XII, Springer Berlin Heidelberg.

Shalaby, et al., "Prediction Model of Bus Arrival and Departure Times Using AVL and APC Data," Journal of Public Transportation, 2004, pp. 41-62, vol. 7, No. 1.

* cited by examiner

TRANSPORTATION INFORMATION SYSTEMS AND METHODS ASSOCIATED WITH DEGRADATION MODES

CROSS REFERENCE TO RELATED APPLICATIONS

The present application claims the benefit of U.S. Provisional Patent Application No. 61/381,361, filed on Sep. 9, 2010, entitled "Transportation Information Systems and Methods" by Gontmakher et al., which is incorporated herein by reference in its entirety.

FIELD

This specification generally relates to transportation information and applications thereof.

BACKGROUND

Transportation information can be used for planning trips. For example, a user can refer to a published route schedule of a transportation system when determining which route to use. Determining which route to take, however, can be challenging for users of transportation systems, for example, when two users try to coordinate with each other to meet using a transportation system. Schedules of transportation systems are often inaccurate compared to actual transportation system performance. Furthermore, transportation systems can fail to alert the user to changes, interruptions, or other situations that affect a planned trip.

BRIEF SUMMARY

Embodiments of this description generally relate to transportation information, and applications thereof. Methods, systems, and techniques for providing transportation information are provided. In general, one aspect of the subject matter described in this specification may be embodied in a method for providing transportation information. An exemplary method for providing transportation information includes the actions of receiving user data associated with public transportation usage. The exemplary method also includes receiving public transportation data. The exemplary method further includes generating scheduling information based on the user data and public transportation data.

Another exemplary method for providing transportation information includes generating first scheduling information for a first user based on first user data, public transportation data, a first starting location, and a destination location. The exemplary method also includes determining whether a second user starting from a second starting location different from the first starting location would like to join the first user. The exemplary method further includes generating second scheduling information for the second user to meet the first user en route based on second user data, the public transportation data, the second starting location, real-time location information for the first user, and the destination location. The exemplary method also includes generating an alert for the second user following the second scheduling information to depart from the second starting location at a specified time to meet the first user following the first scheduling information.

Another exemplary method for providing transportation information includes receiving public transportation data including real-time vehicle location information and at least one of historical real-time vehicle location information or scheduled vehicle location information. The exemplary method also includes determining whether the real-time vehicle location information deviates from at least one of historical real-time vehicle location information or scheduled vehicle location information. The exemplary method further includes generating a schedule degradation mode based on a deviation of real-time vehicle location information from at least one of historical real-time vehicle location information or scheduled vehicle location information. The exemplary method also includes generating first scheduling information for a user based on user data and public transportation data when the deviation does not exceed a threshold. The exemplary method also includes generating second scheduling information, different from the first scheduling information, that includes an indication of the schedule degradation mode for the user based on user data, public transportation data, and the deviation when the deviation exceeds the threshold.

Another exemplary method for providing transportation information includes receiving public transportation data including real-time vehicle location information and at least one of historical vehicle location information or scheduled vehicle location information. The exemplary method also includes generating a schedule degradation mode based on a deviation of real-time vehicle location information from at least one of historical vehicle location information or scheduled vehicle location information. The exemplary method also includes generating scheduling information for a user based on a deviation of real-time vehicle location information from at least one of scheduled vehicle location information or historical real-time vehicle location information. The scheduling information includes an indication of the schedule degradation mode. The scheduling information can be changed substantially based on the schedule degradation mode.

Another exemplary method for providing transportation information includes receiving user data associated with public transportation usage including at least one of user locations, user movements, user transportation queries, user routes, or user vehicles. The exemplary method also includes receiving public transportation data including routes available to a user. The exemplary method further includes generating a user profile for the user based on the user data and the public transportation data. The user profile includes automatically generated route suggestions for the user.

Other embodiments of these aspects include corresponding systems, apparatuses, and computer program products configured to perform the actions of these methods, encoded on computer storage devices.

BRIEF DESCRIPTION OF THE DRAWINGS/FIGURES

Further embodiments, features, and advantages as well as the structure and operation of the various embodiments are described in detail below with reference to the accompanying drawings. In the drawings, like reference numbers may indicate identical or functionally similar elements.

Embodiments are described with reference to the accompanying drawings. The drawing in which an element first appears is typically indicated by the leftmost digit or digits in the corresponding reference number. The drawings are not necessarily drawn to scale.

DETAILED DESCRIPTION

I. Overview
II. System Architecture
III. User Profile
IV. Degradation Modes
V. Determining Relevant Routes for a User
VI. Adapting to User Behavior
VII. Alerts
VIII. Exemplary Methods
IX. Routing
X. Additional Advantages Including Real-Time Applications
XI. Further. Examples
XII. Conclusion I. Overview Embodiments of this disclosure relate to transportation information systems and methods, and applications thereof. Users may need help navigating transportation systems. In one embodiment, user data associated with public transportation usage is received. Public transportation data including real-time public transportation data is received. Scheduling information is generated based on the user data and real-time public transportation data.

Real-time vehicle location information may deviate from scheduled vehicle location information. A user using the scheduled vehicle location information may like to have his scheduling information updated according to real-time vehicle location information. In one embodiment, public transportation data including real-time vehicle location information and scheduled vehicle location information is received. It is determined whether the real-time vehicle location information deviates from the scheduled vehicle location information. A schedule degradation mode is generated based on a deviation of real-time vehicle location information from the scheduled vehicle location information. A schedule can be generated for the user based on the deviation.

In another embodiment, real-time vehicle location information may be compared to historical real-time data for a similar period. In this embodiment, public transportation data including real-time vehicle location information and historical real-time vehicle location information is received. It is determined whether the real-time vehicle location information deviates from the historical real-time vehicle location information. A schedule degradation mode is generated based on a deviation of real-time vehicle location information from the historical real-time vehicle location information. A schedule can be generated for the user based on the deviation.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. System Architecture

Figure 1:
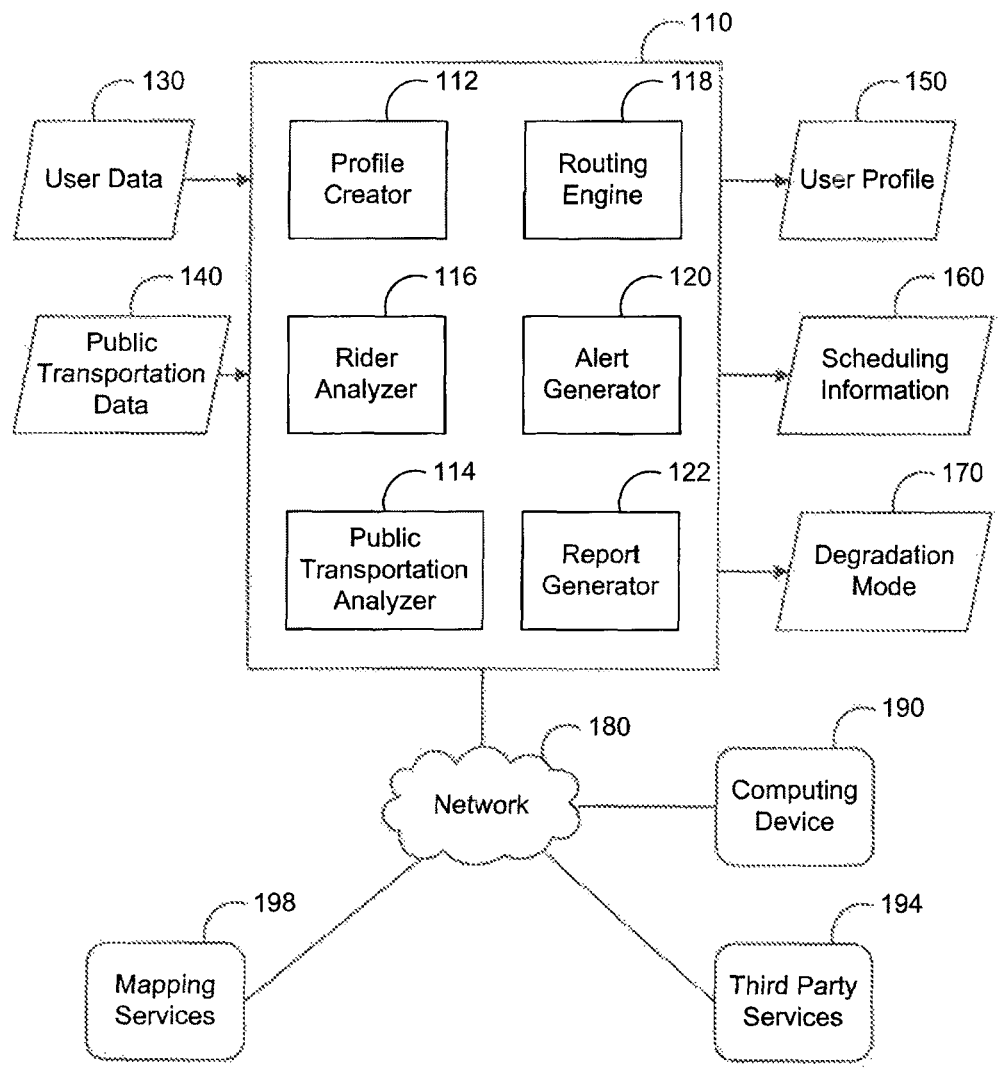
FIG. 1 is a diagram of an exemplary transportation information system, in accordance with an embodiment.

FIG. 1 is a diagram of an exemplary transportation information system 100, in accordance with an embodiment. Transportation information system 100 includes an analyzer 110. Analyzer 110 includes a profile creator 112, public transportation analyzer 114, rider analyzer 116, routing engine 118, alert generator 120, and report generator 122. Analyzer 110 can receive user data 130, public transportation data 140, and other inputs. Analyzer 110 can provide user profile 150, scheduling information 160, degradation mode 170, and other outputs. Report generator 122 can generate reports of the scheduling information.

Analyzer 110 is in communication with network(s) 180, which is in communication with computing device(s) 190, third party service(s) 194, mapping service(s) 198, and other interfaces. Network(s) 180 can include the Internet and one or more networks including local area networks (LANs), wide area networks (WANs), and wireless networks. Computing device(s) 190 can include personal computers, mobile computers including cellular telephones, tablet computing devices, and other devices capable of exchanging information. Third party service(s) 194 can include developers and aggregators. Analyzer 110 can interface with various services, including but not limited to Google Goggles, Google Maps, Google Latitude, Google Calendar, Google Earth, Android, Google Mobile Maps, Google Voice Search, Google Search, and Google Translate. Analyzer 110 can also interface with various transit systems, including but not limited to bus systems, railway systems, subway systems, airline systems, boating systems, traffic infrastructure systems, and alert systems.

Components of transportation information system 100 (e.g., profile creator 112, routing engine 118, alert generator 120, and report generator 122) may be implemented as software, hardware, firmware, or any combination thereof. Components of transportation information system 100 may also be implemented as computer-readable code executed on one or more computing devices capable of carrying out the functionality described herein. Such a computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Note that in alternative embodiments, any subset of the components shown in FIG. 1 may in fact be embodied as a single component. For example, the functionalities of rider analyzer 116 and routing engine 118 may be combined in a single device or module. Other combinations of the functional components of FIG. 1 are also possible, as would be known to a person of skill in the art. Further, analyzer 110 may have more or less than the components shown in FIG. 1.

III. User Profile

Figure 2:
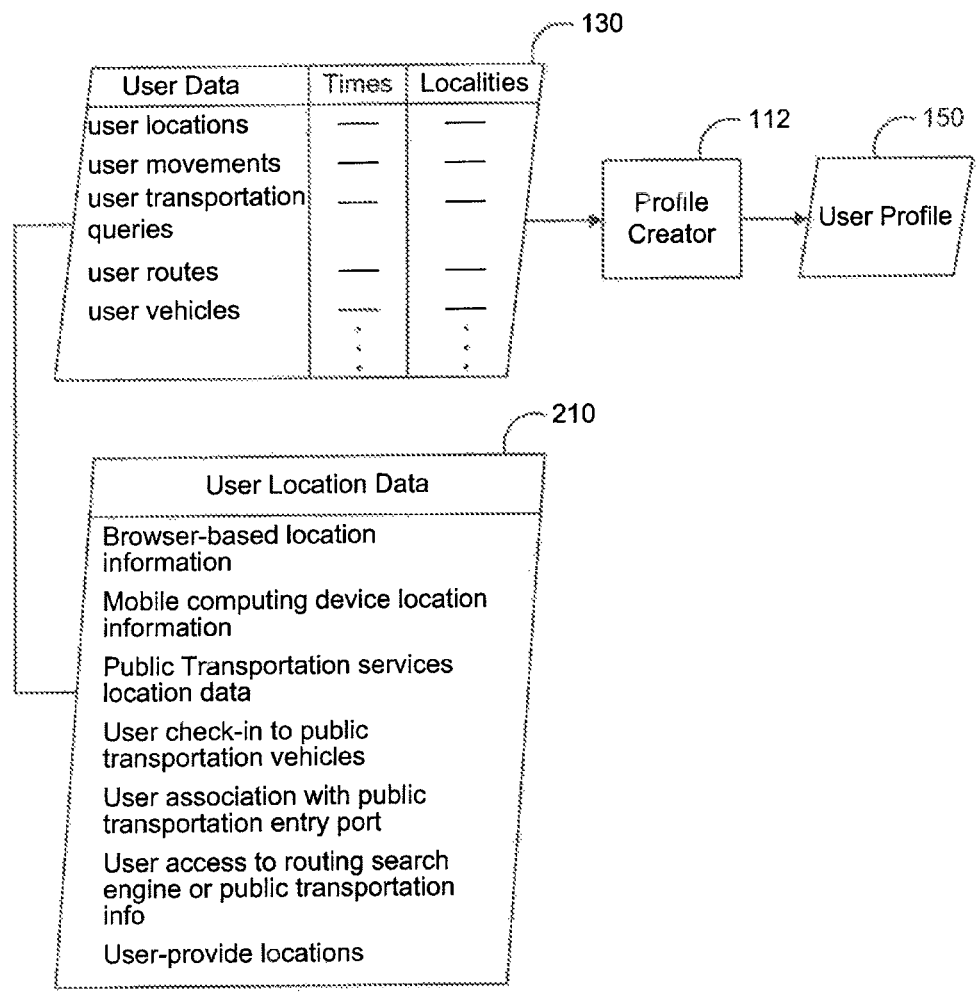
FIG. 2 is a diagram of, an exemplary transportation information system including a profile creator, in accordance with an embodiment.

FIG. 2 is a diagram of an exemplary transportation information system 200 including a profile creator 112, in accordance with an embodiment. Profile creator 112 can receive user data 130 as input, and can provide user profile 150 as output. User data 130 can include user locations, user movements, user transportation queries, user routes, user vehicles, and other user data related to transportation. Times and localities for the user data can also be provided to profile creator 112.

User data 130 can also include user location data 210. User location data 210 enables a user's location to be determined through various techniques. User location data 210 can include browser-based location information, mobile computing device location information, public transportation services location data, user check-in to public transportation vehicles (e.g., swiping an access card at a vehicle-mounted reader), user association with public transportation entry ports (e.g., swiping an access card at a station turnstile), user access to a routing search engine or public transportation information, and user-provided locations such as a home address or business address.

User location data 210 and user data 130 can be used by profile creator 112 to create user profile 150. User profile 150 can be created automatically based on user data 130 and user location data 210. Profile creator 112 can collect known route segments the rider has taken, and build user profile 150. For example, profile creator 112 can collect known route segments a rider has taken from GPS tracks, vehicle/trip check-ins, timing of boarding and alighting from public transportation, and usage of other public transportation applications.

In one embodiment, a transportation information system can learn from user locations, movements, queries, preferred/most used routes, trips, vehicles, and other user data 130, and can thereby provide users with improved transportation information.

IV. Degradation Modes

Figure 3:
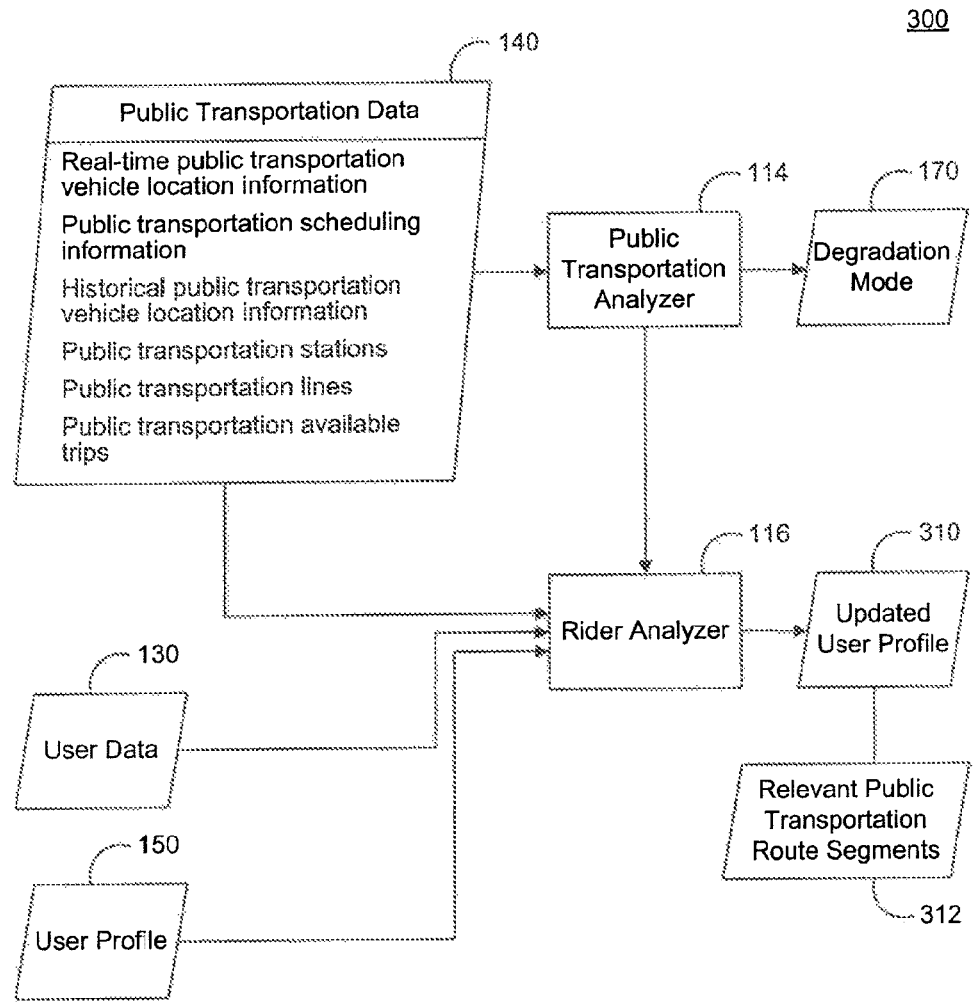
FIG. 3 is a diagram of an exemplary transportation information system including a public transportation analyzer and a rider analyzer, in accordance with an embodiment.

FIG. 3 is a diagram of an exemplary transportation information system 300 including public transportation analyzer 114 and rider analyzer 116, in accordance with an embodiment. Public transportation analyzer 114 can receive public transportation data 140 as input, and provide degradation mode 170 as output. Rider analyzer 116 can receive, as input, public transportation data 140, user data 130, user profile 150, and output from public transportation analyzer 114. Rider analyzer 116 can provide, as output, updated user profile 310 and relevant public transportation route segments 312. Relevant public transportation route segments 312 can be based on updated user profile 310.

Public transportation analyzer 114 can analyze historical, current (including real-time), scheduled, and other types of public transportation data 140. In one example, public transportation data 140 includes real-time public transportation vehicle location information, public transportation scheduling information, historical public transportation vehicle location information, public transportation stations, public transportation lines, and public transportation available trips. Public transportation data 140 can include any relevant information that enables public transportation analyzer 114 to prepare an analysis.

Public transportation systems can have a schedule which determines at what times public transportation vehicles pass certain stations or time points corresponding to the schedule. As long as the transit network operates according to the schedule, very precise plans for trip requests can be generated. Even if vehicles deviate slightly from the schedule, precise routing can provide useful information to users because the vehicles should deviate only slightly from the precise plans.

A service provided by a transit network can become degraded even beyond slight deviations from the schedule. Degradation, including even slight deviations, can be detected by public transportation analyzer 114 and indicated by degradation mode 170. In one embodiment, scheduling information is substantially changed based on degradation mode 170.

Degradation of public transportation systems can occur in many situations. For example, during rush hour, buses may not keep up with their schedule because of general traffic or congestion. Buses serving the same line might overtake each other and affect the times at which they arrive, depart, and service each bus stop or reach a point in the schedule. Unpredictable changes that affect the transportation system can cause the operation of the transportation system to depart significantly from the schedule, so that the schedule can no longer be relied upon. Such unpredictable changes can include accidents, rerouting, cancellations, extra trips, dispatcher intervention, and other unpredictable changes. Furthermore, changes in one portion of the transportation system can affect other portions of the transportation system, sometimes in ways that are not immediately apparent to users or even operators.

Different degradation modes can be used to enable different handling by embodiments of a transportation information system. Degradation modes can apply to an entire public transportation system/transit network, or part of the public transportation system/transit network.

A degradation mode can indicate that service is running according to schedule with high precision. In one embodiment, real-time service and scheduled vehicle information may determine what constitutes when a service is running according to schedule with high precision. In one example, transportation in City A usually runs on time. In City A, a service may be deemed as running according to schedule with high precision when real-time public transportation vehicle information is running within, for example, two minutes of the scheduled vehicle location information. In another example, transportation in City B does not usually run on time. In City B, a service may be deemed as running according to schedule with high precision when real-time public transportation vehicle information is running within, for example, fifteen minutes of the scheduled vehicle location information.

In another embodiment, real-time service and historical vehicle information may determine what constitutes when a service is running according to schedule with high precision.

Another degradation mode can indicate that service is running according to schedule, with significant deviations. In one embodiment, real-time service and scheduled vehicle information may determine what constitutes when a service is running according to schedule with significant deviations. In one example, transportation in City A usually runs on time. In City A, a service may be deemed as running according to schedule with significant deviations when real-time public transportation vehicle information is running, for example, six minutes late from the scheduled vehicle location information. In another example, transportation in City B does not usually run on time. In City B, a service may be deemed as running according to schedule with significant deviations when real-time public transportation vehicle information is running, for example, forty-five minutes late from the scheduled vehicle location information.

In another embodiment, real-time service and historical vehicle location information may determine what constitutes when a service is running according to schedule, with significant deviations.

Yet another degradation mode can indicate that service is not running according to schedule at all, but an approximate frequency of vehicles is still maintained. An approximate frequency of vehicles may correspond to normal operating mode for some agencies. Yet another degradation mode can indicate that service is not running according to either schedule or frequencies (for example, no bus serving a station for 30 minutes where normally a bus serves that station every 10 minutes).

In one embodiment, various services can be provided depending on the degradation mode. The way routes are computed can be changed, e.g., the way that scheduling information is determined and provided. For example, when routes are computed according to a schedule and the next bus passes the first station in 10 minutes, that 10 minutes is used as a basis for starting the route. In one embodiment, if a transportation information system detects that the transit network is now operating in a degradation mode associated with frequency-only, the route can be started from the current time, and vehicle frequency used as an expected waiting time. Generating scheduling information may include generating a route based on a current time and using the approximate frequency of vehicles as an expected wait time.

In one embodiment, a transportation information system can change the way routes (including requested scheduling information 160) are displayed, corresponding to the degradation mode. Public transportation analyzer 114 may provide a degradation mode based on a deviation of real-time public transportation vehicle location information from second transportation information. The second transportation information can be historical real-time vehicle location information or scheduled vehicle location information. For example, a route can be displayed to indicate that timing is imprecise corresponding to the degradation mode, and that scheduling information 160 is computed based on approximate, and not precise, scheduling times. In one embodiment, a transportation information system can compute and display confidence intervals in the computed timings associated with scheduling information 160.

In one embodiment, users can be alerted in association with a degradation mode. A transit network may supply alerts for service disruptions, but such alerts may not enable a user to predict what affect the alert will have on a planned trip. In one embodiment, a transportation information system can use such alerts to inform a user of an event, and can also derive and show an alert independently from the transit network alerts (separate from or in addition to showing routes in a different way). Alerts may be generated and shown in the following contexts: i) when the user views the map in public transport mode (or just zoomed in enough), ii) when the user views schedules of a station or a line, iii) when the user views a computed route, and iv) while the user is following a previously computed route. Additional techniques and combinations of generating and showing alerts are possible.

Various techniques can be used to compute degradation mode 170. In one embodiment, public transportation analyzer 114 can compare real-time vehicle positions or arrival estimations with the schedule. In another embodiment, public transportation analyzer 114 can compare real-time vehicle positions or arrival estimations with historical data for a similar period. The historical data can be collected over time from a transit network if available, or can be collected over time using embodiments of the transportation information system. Such comparisons can enable embodiments to compute how unusual is the current situation, e.g., degradation mode 170.

Generating an alert can be dependent on schedule adherence. For example, for Zurich, where schedule adherence is high, alerts regarding degradation mode 170 can be generated when a train is over one minute late (and a severe alert if the train is over 10 minutes late). In contrast, for a bus system somewhere else where schedule adherence is not as high, the corresponding values for generating alerts may be 15 minutes or an hour, adjustable depending on such factors as the schedule adherence, historical performance, and real-time data for the particular transit network.

V. Determining Relevant Routes for a User

Referring again to the embodiment illustrated in FIG. 3, rider analyzer 116 can receive as input public transportation data 140, user data 130, user profile 150, and output from public transportation analyzer 114. Rider analyzer 116 can then analyze the inputs and generate an updated user profile 310, including relevant public transportation route segments 312.

Users (e.g., public transportation riders) over time can develop some public transportation usage patterns that may be temporal or local. Temporal travel patterns of a user may include the user traveling at the same time of day. Locality travel patterns of a user may include the user traveling with the same service, though not necessarily the same trip every day. In one embodiment, rider analyzer 116 can identify a cluster of route segments in a transit network that is relevant to a user, and generate an updated user profile 310 that assigns those route segments to updated user profile 310. In one example, locations and times of day can be assigned to a user profile. In one embodiment, a user's relevant route segments can be automatically detected based on the user's user profile 150.

Updated user profile 310 can be generated based on detecting features of the transit network local to the user. The local transit network can be segmented and clustered into used and unused services for that user. Clustering can be done locally (similar routes, as defined by vehicle type, route, etc., up to mild variations, including different times of day). Clustering can also be done temporally (services running along a similar route, or sharing similar start and end points, at similar times of the day over time). The route segment clusters can then be used to identify relevant public transportation route segments 312 and other information that may affect the user's trip. Relevant public transportation route segments 312 and other information can be provided to the user. For example, relevant public transportation route segments 312 may be displayed on a screen of a computing device for the user. Relevant public transportation route segments 312 and other information can be stored in updated user profile 310.

In some embodiments, using updated user profile 310 can provide various applications. Personalized nearby public transportation information can be enabled for the user. For example, in one embodiment, nearby stations, lines, and trips can be ranked according to the user's profile.

In some embodiments, public transportation service alerts can be personalized to a user based on deduced commute routes, regardless of an exact time of travel. Alert severity can be customized based on an importance to the user. For example, a mild delay in a station outside of the user's area may still lead to severe delays on a service relevant to the user. Accordingly, the user is alerted even though it may not have been apparent to the user that the mild delay in a station outside of the user's area would have led to a delay that affected the user.

In one embodiment, routes that the user is not taking can be suggested to the user by analyzing that such routes fit the user's profile or provide benefits. Users may not always know all the transit systems around them or know the fastest route using a transit system. In one example, a suggested route may be faster than the user's currently chosen route. Other benefits may be based on other criteria, such as providing routes having fewer connections, using a rail transportation system instead of a bus, and so on.

In one embodiment, an alert is generated when a user is taking a vehicle that does not fit the user's profile, or is otherwise an unexpected selection for the user based on user profile 150, updated user profile 310, or both (e.g., going on a bus that differs from the user's usual commute at a time when the user is expected to take another action such as going home).

In one embodiment, a transit system can be personalized for a user by providing known trips for the user (analyzed from user profile 150, updated user profile 310, or both). In another embodiment, a transportation information system can enable the user to compare previously taken routes to newly suggested routes.

In one embodiment, a transportation information system can provide useful defaults for user routing queries. For example, rider analyzer 116 may take note of queries entered by a user and a trip that the user ultimately decides to take. This data may be used to offer suggestions to other users when searching similar trips. User profile 150, updated user profile 310, or both can enable embodiments to find a reasonable set of from and to locations and relevant times of day for the user.

In one embodiment, user preferences for routing parameters can be learned. In one example, rider analyzer 116 can determine appropriate connection time buffers, walking speeds, vehicle type preferences, walking distance preferences, and other user preferences by automatic analysis of various data. In another example, user preferences can be manually configured. In some embodiments, the use of a user's transportation information may be provided as an opt-in service where a user may indicate in advance his or her approval of use of the user's transportation information.

Figure 4:
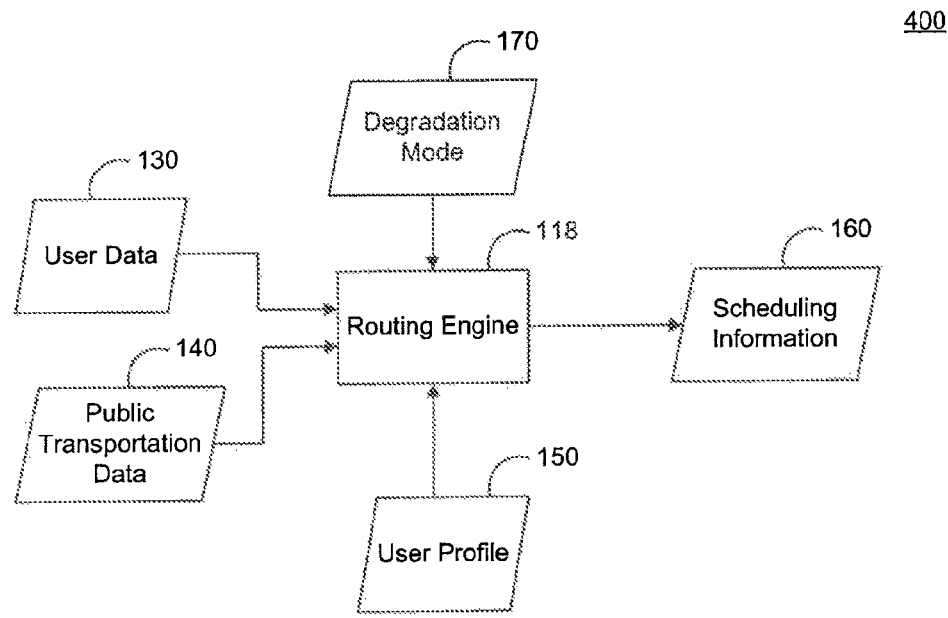
FIG. 4 is a diagram of an exemplary transportation information system including a routing engine and a degradation mode, in accordance with an embodiment.

FIG. 4 is a diagram of an exemplary transportation information system 400 including routing engine 118 and degradation mode 170, in accordance with an embodiment.

Routing engine 118 can receive, as input, user data 130, public transportation data 140, user profile 150, and degradation mode 170. Accordingly, routing engine 118 can provide scheduling information 160 as output, including an indication of degradation mode 170. For example, scheduling information 160 can include explicit mention of the degradation mode and the level of deviation from the schedule. Scheduling information 160 can also be presented in a way that visually represents the level of degradation or deviation from the schedule. For example, a circle centered on a destination can approximate a range of arrival times using a corresponding diameter, in contrast to a point. Routing engine 118 may display the generated scheduling information to a user (e.g., on the user's computing device). Based on degradation mode 170, routing engine 118 may alter an appearance of scheduling information 160.

VI. Adapting to User Behavior

Figure 5:
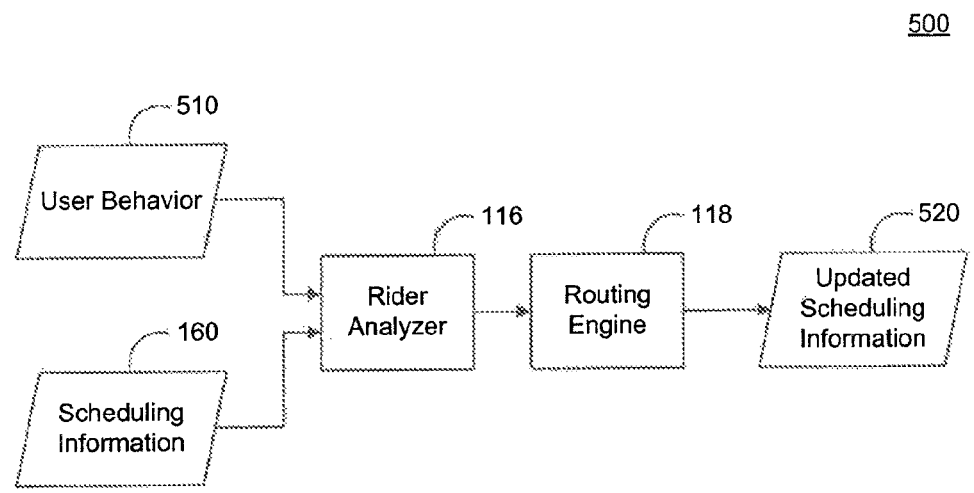
FIG. 5 is a diagram of an exemplary transportation information system including a rider analyzer, a routing engine, and updated scheduling information, in accordance with an embodiment.

FIG. 5 is a diagram of an exemplary transportation information system 500 including rider analyzer 116, routing engine 118, and updated scheduling information 520, in accordance with an embodiment. Rider analyzer 116 can receive, as input, user behavior 510 and scheduling information 160. Rider analyzer 116 can detect discrepancies between routing suggestions, provided in scheduling information 160, and routes users actually take, provided in user behavior 510. Rider analyzer 116 can provide the analysis results to routing engine 118. Routing engine 118 can use the output from rider analyzer 116 to generate updated scheduling information 520. In one embodiment, a transportation information system can adapt to user preferences, and provide popular routes that are more consistent with user behavior 510. In another embodiment, a transportation information system can provide an indication that scheduling information has been updated, e.g., when generating updated scheduling information 520. The user can be asked to verify whether updated scheduling information 520 is desirable.

VII. Alerts

Figure 6:
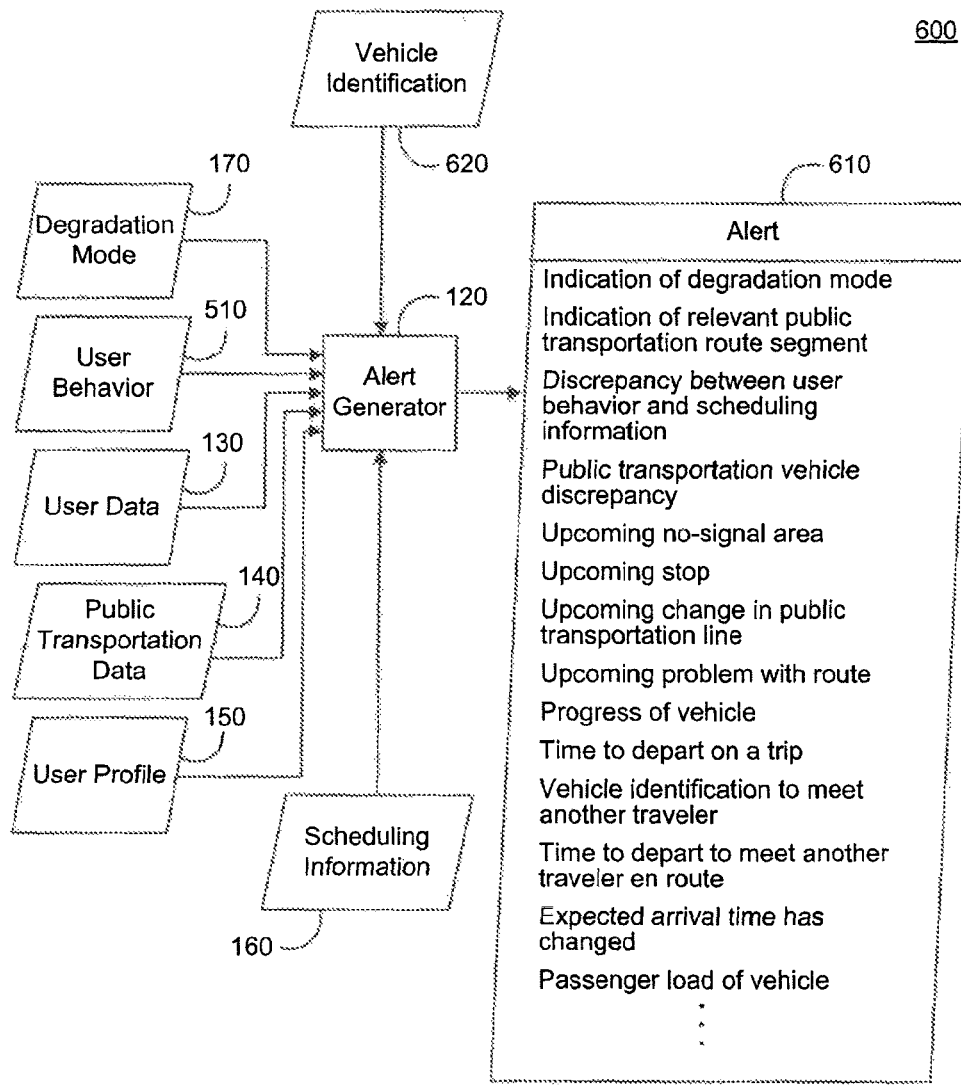
FIG. 6 is a diagram of an exemplary transportation information system including an alert generator and an alert, in accordance with an embodiment.

FIG. 6 is a diagram of an exemplary transportation information system 600 including alert generator 120 and alert 610, in accordance with an embodiment. Alert generator 120 can receive, as input, degradation mode 170, user behavior 510, user data 130, public transportation data 140, user profile 150, scheduling information 160, and vehicle identification 620.

Vehicle identification 620 can be determined using various techniques. For example, determining which vehicle a user (passenger of the identified vehicle) is on can involve matching the user's location with real-time data for the identified vehicle's location. The user's location can be provided by a Global Positioning System (GPS) feature on the user's portable computing device such as, for example, a smartphone. Other location methods are possible, including wireless signal triangulation. The identified vehicle location can be provided by, for example, transit agencies.

In one embodiment, vehicle identification 620, corresponding to the user's location, can be provided to alert generator 120. Alert generator 120 can generate alert 610, which can be used in various applications. Although not illustrated, vehicle identification 620 can be provided to various other components of analyzer 110, including rider analyzer 116, routing engine 118, and other components.

In one example, when a train is about to enter a tunnel and the user will lose GPS location, alert 610 can be used to notify analyzer 110 to use a different method of determining the user's location. In one embodiment, analyzer 110 can determine a user's location based on a position of the vehicle the user is in, according to vehicle identification 620. Position data for the identified vehicle may be gathered using a GPS that functions in tunnels, odometer readings that give the distance the train has travelled, or other methods. For example, a transit network may use transponders positioned on the tracks to identify train locations. Even during a detour, the system can determine that the vehicle will arrive at a specific station, information which can be used for locating the vehicle and user. Alert 610 can also be used to notify tee user that a different method of location detection is being used for the user. A user's GPS can be compared with a vehicle's GPS to determine that the user is on a particular vehicle. The user can be "checked in" to that vehicle. The user may also be given the option of manually "checking in" to a vehicle. The user can send the vehicle information to other users who can be kept informed of the user's progress via that vehicle's progress.

In one embodiment, alert 610 can be used to provide various information to the user. In another embodiment, alert 610 can be used to provide various information to analyzer 110. Alert 610 can warn the user that the vehicle the user is on is about to enter an area with no cellular signal or no GPS signal. This is useful, for example, if the user is on the phone during a telephone call or using data provided by the cellular signal or GPS signal. Alert 610 can notify the user that analyzer 110 may not be able to provide trip advice while the user is in the tunnel or otherwise without a data signal, GPS signal, or both.

Alert 610 can be used to notify analyzer 110, the user, or both when the vehicle the user is on is about to reach the user's stop. Alert 610 can be used to alert the user if the user is going to miss a connection on a planned trip.

Alert 610 can be used to notify other people regarding the user's status. For example, a user's friend who is going to meet the user can be notified of the user's progress on a trip based on the predictions analyzer 110 has for the identified vehicle the user is traveling on.

Alert 610 can provide basic information about the trip the user is currently on. For example, analyzer 110 can provide scheduling information 160 including a list of upcoming stations and estimated times, similar to that which is often displayed on trams. Alert 610 can provide notifications of this information to the user, e.g., on the user's own device such as a mobile computing device.

Alert 610 can provide a warning of problems up ahead along the user's route so that the user can reroute before getting stuck.

VIII. Exemplary Methods

Figure 7:
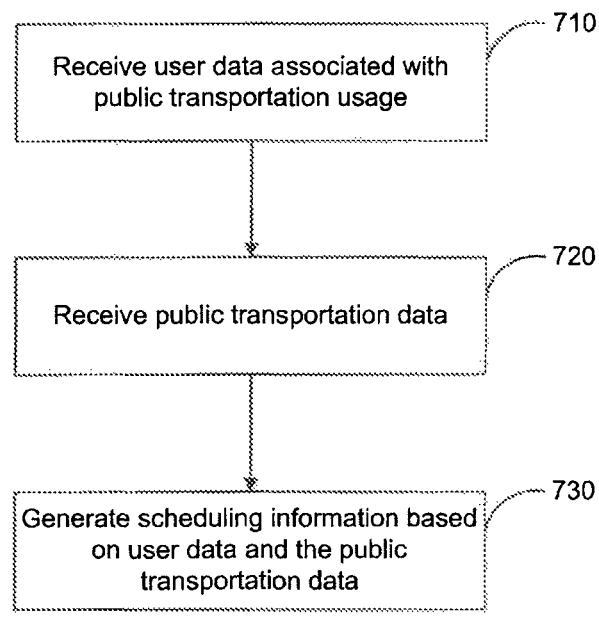
FIG. 7 is a flowchart of a method for providing transportation information, in accordance with an embodiment.

FIG. 7 is a flowchart 700 of a method for providing transportation information, in accordance with an embodiment. At a stage 710, user data associated with public transportation usage is received. At a stage 720, public transportation data is received. At a stage 730, scheduling information is generated based on the user data and the public transportation data.

Figure 8:
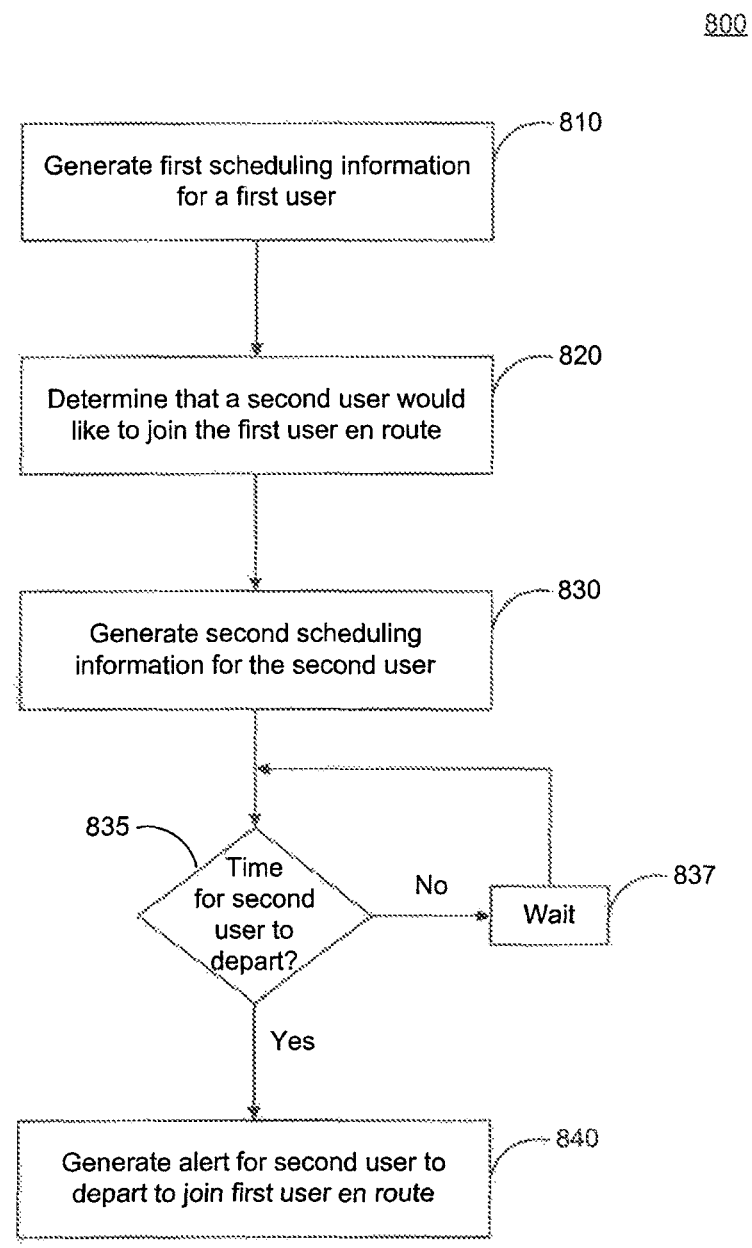
FIG. 8 is a flowchart of another method for providing transportation information, in accordance with an embodiment.

FIG. 8 is a flowchart 800 of a method for providing transportation information, in accordance with an embodiment. At a stage 810, first scheduling information is generated for a first user. In one embodiment, routing engine 118 may generate first scheduling information for a first user based on first user data, public transportation data, a first starting location, and a first destination location.

At a stage 820, it is determined that a second user would like to join the first user en route. In one embodiment, routing engine 118 may determine that a second user starting from a second starting location different from the first starting location would like to join the first user.

At a stage 830, second scheduling information is generated for the second user. In one embodiment, routing engine 118 may generate second scheduling information for a second user to meet the first user based on second user data, public transportation data, the second starting location, real-time location information for the first user, and a second destination location.

At a stage 835, it is determined whether it is time for the second user to depart. If it is not time for the second user to depart, the system waits at a stage 837 and process flow returns to stage 835. If it is time for the second user to depart, at a stage 840, an alert is generated for the second user to depart to join the first user en route. In one embodiment, alert generator 120 generates an alert for the second user to depart to join the first user. Alert generator 120 may generate an alert for the second user to depart from a second starting location at a specified time to meet the first user.

Figure 9:
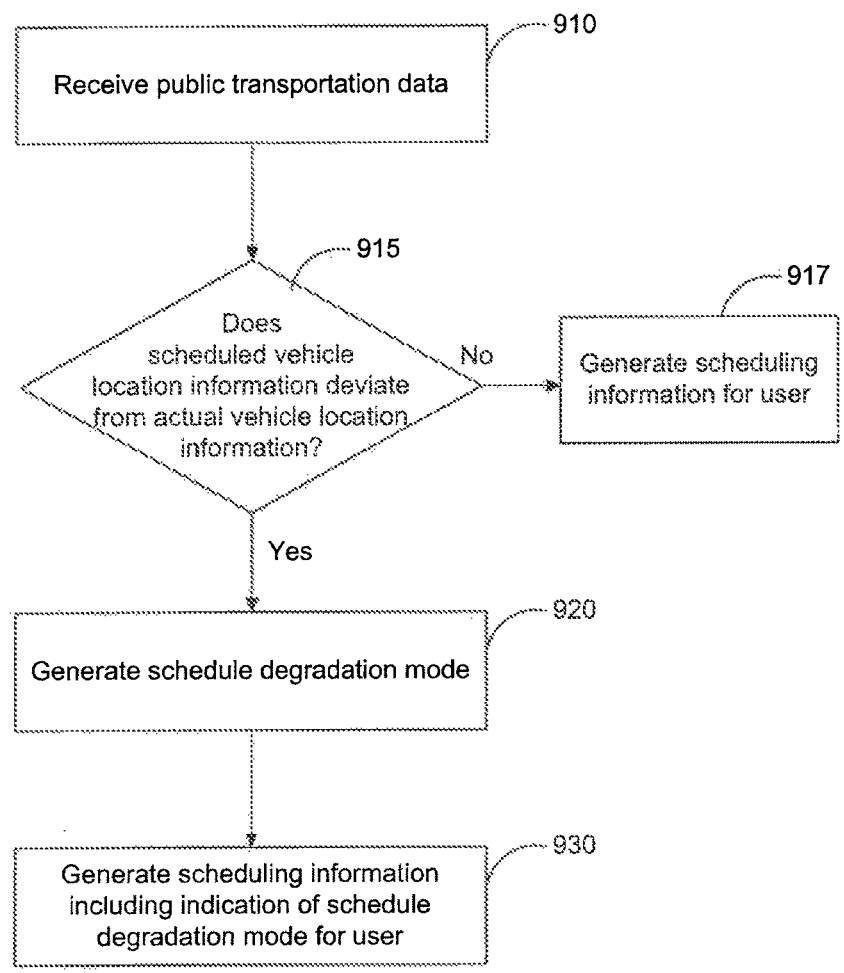
FIG. 9 is a flowchart of another method for providing transportation information, in accordance with an embodiment.

FIG. 9 is a flowchart 900 of a method for providing transportation information, in accordance with an embodiment. At a stage 910, public transportation data is received. The public transportation data may include scheduled vehicle location information and actual vehicle location information. At a stage 915, it is determined whether scheduled vehicle location information deviates from actual vehicle location information. If the deviation does not exceed a threshold, at a stage 917, scheduling information is generated for the user. If the deviation exceeds a threshold, at a stage 920, a schedule degradation mode is generated. At a stage 930, scheduling information including an indication of the schedule degradation mode is generated for the user.

Figure 10:
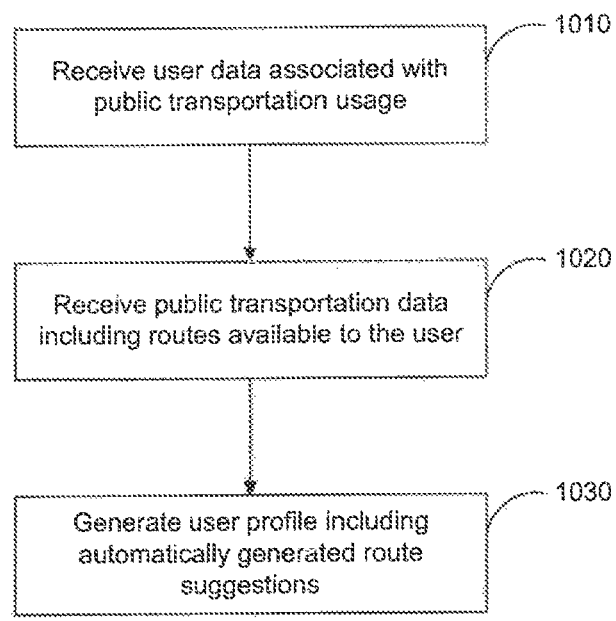
FIG. 10 is a flowchart of another method for providing transportation information, in accordance with an embodiment.

FIG. 10 is a flowchart 1000 of a method for providing transportation information, in accordance with an embodiment. At a stage 1010, user data associated with public transportation usage is received. At a stage 1020, public transportation data including routes available to the user is received. At a stage 1030, a user profile including automatically generated route suggestions is generated.

Figure 11:
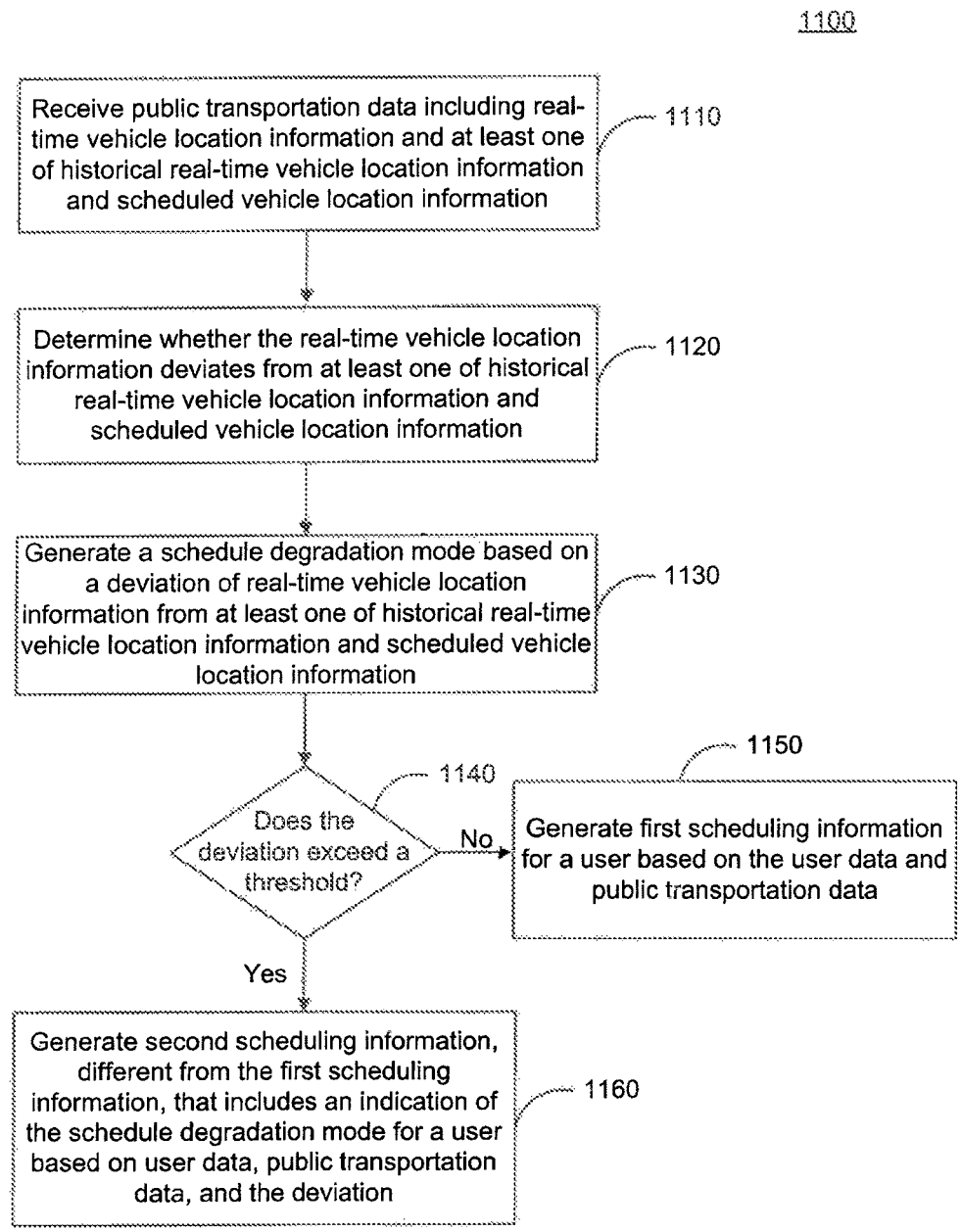
FIG. 11 is a flowchart of another method for providing transportation information, in accordance with an embodiment.

FIG. 11 is a flowchart 1100 of a method for providing transportation information, in accordance with an embodiment. At a stage 1110, public transportation data including real-time vehicle location information and at least one of historical real-time vehicle location information and scheduled vehicle location information is received. At a stage 1120, it is determined whether the real-time vehicle location information deviates from at least one of historical real-time vehicle location information and scheduled vehicle location information. At a stage 1130, a schedule degradation mode is generated based on a deviation of real-time vehicle location information from at least one of historical real-time vehicle location information and scheduled vehicle location information. At a stage 1140, it is determined whether the deviation exceeds a threshold. If the deviation does not exceed the threshold, at a stage 1150, first scheduling information for a user is generated based on the user data and public transportation data. If the deviation exceeds the threshold, at a stage 1160, second scheduling information, different from the first scheduling information, is generated that includes an indication of the schedule degradation mode for a user based on user data, public transportation data, and the deviation.

IX. Routing

Figure 12:
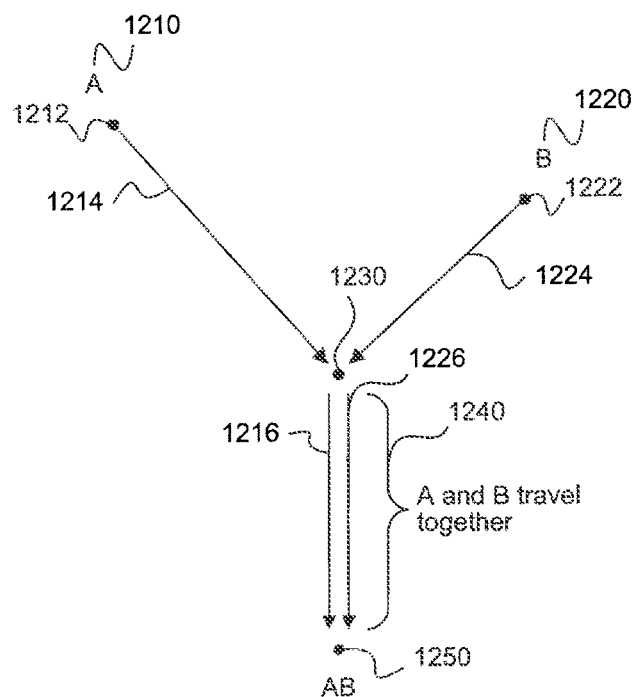
FIG. 12 is a diagram of an application of an exemplary transportation information system, in accordance with an embodiment.

FIG. 12 is a diagram of an application of an exemplary transportation information system, in accordance with an embodiment. Users A 1210 and B 1220 agree to meet at a destination 1250, e.g., a restaurant, using a transit system. A 1210 plans his route to destination 1250. A's route from origin 1212 to destination 1250 includes portions 1214 and 1216. Along the way, A's vehicle makes stops, including a stop 1230 (e.g., at a station). A 1210 shares his itinerary with B 1220. B 1220 chooses to "join" this trip. A's scheduling information and B's scheduling information can be generated based on different forms of travel used by A and B (e.g., their travel preferences).

A 1210 begins the trip at origin 1212, and once he boards the vehicle at origin 1212, the actual times of the vehicles he will catch are calculated (based on best approximations of connection times, degradation modes, etc., as determined by analyzer 110).

B 1220 is informed when to begin his trip so that he will meet with A 1210 at stop 1230. B's route from origin 1222 to destination 1250 includes portions 1224 and 1226. B's vehicle makes a stop at stop 1230.

In one embodiment, a transportation information system instructs B 1220 such that B 1220 arrives at stop 1230 in time to catch the vehicle that A 1210 is using. Therefore, A 1210 and B 1220 meet on the vehicle, and travel together (for example, along the last leg 1240 of a journey). A 1210 and B 1220 proceed to destination 1250 together, and do not have to ride separately in portions 1216 and 1226 of the trip. In one embodiment, a vehicle that A 1210 is riding on that travels along a path of A's generated scheduling information is identified. The identified vehicle and path are included in B's generated scheduling information.

During travel, A 1210 or B 1220 may experience delays or a deviation from the original scheduling information. In one embodiment, A's scheduling information is updated based on real-time transportation data of B 1220. In another embodiment, B's scheduling information is updated based on real-time transportation data of A 1210. For example, if A 1210 is delayed and there are multiple stops along B's path (not shown), B 1220 may decide to exit a transportation vehicle that B 1220 is riding on, take a coffee break at a particular stop for a time period, and take a different transportation vehicle at a later point in time to join A 1210 at stop 1230.

In one embodiment, A 1210 is alerted when real-time transportation data of B 1220 deviates from the second scheduling information. In another embodiment, B 1220 is alerted when real-time transportation data of A 1210 deviates from the first scheduling information.

Figure 13:
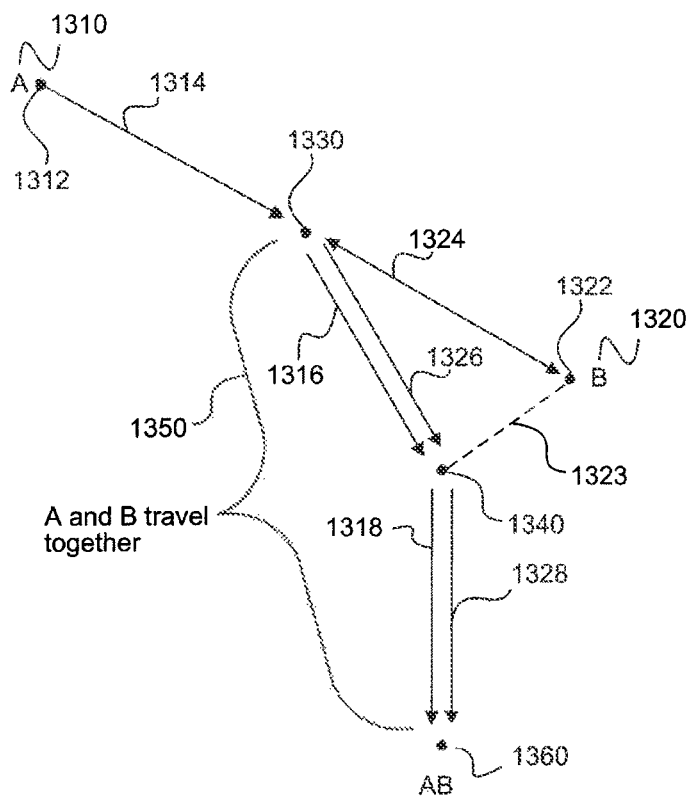
FIG. 13 is a diagram of an application of an exemplary transportation information system, in accordance with an embodiment.

FIG. 13 is a diagram of an application of an exemplary transportation information system, in accordance with an embodiment. As illustrated, the system can choose different routes, and even modify a passenger's route postfactum, in order to maximize a portion 1350 of the trip that users A 1310 and B 1320 spend together. For example, B 1320, if traveling alone or taking a direct trip, would not typically choose to travel away from a destination 1360. B 1320, however, might choose to go out of his way if that helped him meet A 1310 sooner and allowed A 1310 and B 1320 to spend more time together on the trip.

In one embodiment, A's scheduling information may be adjusted to increase a portion of the trip that A 1310 and B 1320 spend together. In another embodiment, B's scheduling information may be adjusted to increase a portion of the trip that A 1310 and B 1320 spend together. For example, a distance of B's generated route that includes the path of A's generated route is longer than a distance of another route from B's starting location to B's destination location. In this embodiment, A 1310 and B 1320 spend more time together along the route.

As illustrated, A 1310 departs from origin 1312, proceeds along path 1314 to a stop 1330, then along path 1316 to stop 1340, and along path 1318 to stop 1360. A 1310 shares his itinerary with B 1320 and B 1320 chooses to join A's trip.

B 1320 has an option of traveling a more direct route from origin 1322 along path 1323 to stop 1340. B 1320, however, chooses to spend more time with A 1310 during the trip. In one embodiment, it is determined that B 1320 can travel along path 1324 and intercept A 1310 by catching A's vehicle at stop 1330. In this embodiment, B 1320 can be instructed when to depart from origin 1322, and the vehicle in which A 1310 is riding can be identified, so that B 1320 can find A 1310.

Accordingly, for the remainder of trip 1350, A 1310 and B 1320 travel together from stop 1330 to stop 1340 and on to destination 1360. This avoids A 1310 and B 1320 from having to travel separately along paths 1316/1326 and 1318/1328.

Figure 14:
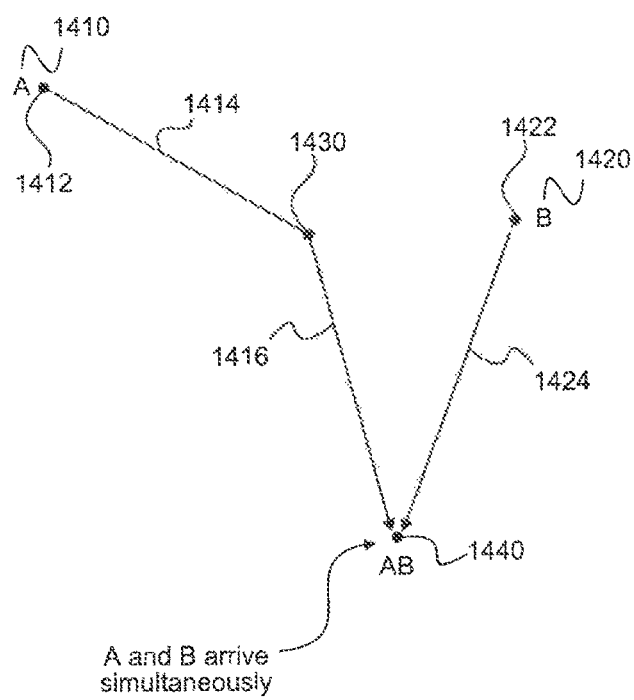
FIG. 14 is a diagram of an application of an exemplary transportation information system, in accordance with an embodiment.

FIG. 14 is a diagram of an application of an exemplary transportation information system, in accordance with an embodiment. Users A 1410 and B 1420 want to meet at a common location, timed to arrive approximately simultaneously at destination 1440. A 1410 is departing from origin 1412, and B 1420 is departing from origin 1422.

The system can determine that A's path will take more time, and generate scheduling instructions for A 1410 to depart before B 1420 departs. A 1410 travels along path 1414 to stop 1430, then along path 1416 to destination 1440. While A 1410 is traveling, the system determines when B 1420 should depart from origin 1422. B 1420 then departs and travels along path 1424. B 1420 arrives at destination 1440 approximately at the same time as A 1410, meeting A 1410 at destination 1440.

If A's trip changes or is rerouted for some reason, then the system can notify B 1420, reroute A 1410, reroute B 1420, or a combination of these. For example, if A 1410 misses a connection, B 1420 is notified and can be rerouted to meet A 1410. The system may determine that B 1420 should leave at a later time. Similarly, A 1410 can be notified of changes in B's trip. For example, A 1410 can be notified that B 1420 has chosen to join A's trip, or that B 1420 is expected to meet A 1410 at a certain point. If B's trip changes, A 1410 can be updated and decide whether to be rerouted.

Embodiments illustrated in FIGS. 12-14 can be used between multiple vehicle types, including between public transit and personal transportation. If A 1410 is meeting B 1420 simultaneously in FIG. 14, the system can track when A 1410 gets on the train at origin 1412, for example. The system will calculate when B 1420 should get in his car, for example, so that B 1420 arrives at destination 1440 at approximately the same time that A 1410 arrives at destination 1440. This can be extended to any form of traveling such as walking, bicycling, car driving, bus systems, train systems, and any combination of these for routing or meeting en route.

X. Additional Advantages Including Real-Time Applications

In one embodiment, riders can be alerted as to the capacity of various vehicles. In one example, the system can notify a user that a bus or train car is full. In this example, the user can plan to catch the next bus or train car that is not as crowded. In one embodiment, a transportation information system can determine such information based on information from a transit system, user behavior 510, and other data that can identify passenger load in a vehicle.

In one embodiment, a transportation information system can notify users of various features of a transit network/system. For example, embodiments can determine that it is raining, and therefore can advise a user which stops have a shelter to avoid the rain. For example, the system can alert the user to get off one stop early, so that the user can wait under a shelter at the earlier stop.

Embodiments can be used for real-time information in public transportation systems. Users, developers, aggregators, and others can use the information in various ways. Developers/a developer feed can query a subset of the data. An example query can be "arrivals at station X in the next 10 minutes." Embodiments can provide information with little need to cross reference, and can synthesize many standards across a variety of transportation systems. A snapshot of all the data can be provided, e.g., for an aggregator/aggregator feed. The data can be provided in a consistent format. Data formats can be optimized for aggregation, including a reference to a static schedule and incremental updates.

Real-time data can be useful for alerting users if a vehicle is late or otherwise deviating from a schedule, rerouting a trip, or knowing that an event affects a user's trip. For example, embodiments of a transportation information system can determine whether parts of a public transit system route lack cellular or GPS signals and offer a user the choice of choosing another route with more reliable wireless signals. Embodiments can determine signal dead-spots where there are no requests coming from mobile networks. In high-usage areas, such as major cities, dead-spots may correspond to areas with no signal and embodiments can build up highly localized coverage maps. In one embodiment, information can be collected where wireless signals are available on public transit systems. Users can rely on the collected information and be able to select options including trip routing to maximize signal availability. For example, a user may be willing to pay a penalty in trip time in order to have a 3G signal available for the entire trip. Real-time location data for a user can be used to convert a statically planned trip (e.g., origin/path/destination) to a precise list of concrete vehicles, times, or both associated with the trip.

Scheduled information can be matched with real-time data, and can provide updates in the form of time increments to a schedule on a per-trip basis. Real-time data can include service alerts, schedule updates, location information (e.g., users and transit systems), passenger loads, video camera feeds, user GPS information, and other data. Raw data can be made available to websites and other data distributors. Embodiments can provide integration for otherwise loosely connected internal systems at an agency, and compensate when the relation of actual traffic versus scheduled traffic degrades over time.

XI. Further Examples

The following table is an example of a first trip joining scenario:

| Time | Marcus's Trip | Phil's Trip |
|---|---|---|
| Any time before trip | Searches for a trip from A to B and decides on a route using public transit | |
| Any time at/before trip | Sends itinerary to Phil | Receives itinerary from Marcus |
| 11:57 | Gets on Bus 94 from Hallenbad Oerlikon. | Phil's phone knows that Marcus has started the trip and so calculates the actual trips Marcus will be on from the itinerary and the information we have on schedules and current time. |
| 12:00 | Arrives at Bahnhof Oerlikon | |
| 12:04 | | Phil is alerted that he should leave the office in 5 minutes in order to catch the same train as Marcus |
| 12:07 | Takes the S16 from Bahnhof Oerlikon towards Bahnhof Tiefenbrunnen. | |
| 12:09 | | Phil is alerted that he should leave the office now in order to catch the same train as Marcus. He leaves the office. |

-continued

| Time | Marcus's Trip | Phil's Trip |
|---|---|---|
| 12:15 | Passes through Zurich Hauptbahnhof on the train. Meets Phil on the train. | Gets on the S16 at Zurich Huptbahnhof towards Bahnhof Tiefenbrunnen. Meets Marcus on the train. |
| 12:20 | Phil and Marcus arrive together at Bahnhof Tiefenbrunnen. | Phil and Marcus arrive together at Bahnhof Tiefenbrunnen. |

The following are examples illustrating trip joining, and other features:

1. Morning Commute: Marcus lives near Altersheim, Zurich. Route to work: Bus 140 from Altersheim to Langnau then the S4 from Langnau to Zurich HB.

Marcus gets up and receives an alert on his phone that the bus to the train station is cancelled. Since it is only a short walk to the train, he can just leave a bit earlier and still catch the train.

Once Marcus arrives at Langnau, he gets on the train. There has been an accident up ahead. Accordingly, he receives an alert that the train is not going to be able to reach Zurich HB. Rather than wait to get close to the destination and be stuck, his phone informs him to exit the train three stops early and take a tram instead.

Marcus arrives at work on time, despite the cancellations and delays.

2. Lunch: Marcus's friend, Phil, calls him about a new restaurant and suggests they meet there for lunch. Phil sends his itinerary to Marcus and he agrees to join Phil on his journey to the restaurant.

Phil lives in Oerlikon and takes a bus to reach his local train station. As soon as he starts his trip to the restaurant Marcus's phone keeps track of Phil's journey and informs him when to leave the office. Phil changes onto the S6 to reach the restaurant at Bahnhof Tiefenbrunnen. Marcus has live information on when the train will pass Zurich HB, near Marcus's work. Marcus is alerted when to start walking to the station and which train and carriage to take so that Marcus and Phil meet on the train. They arrive at the restaurant together.

Marcus's phone knows when his first meeting of the afternoon is and alerts him when he needs to take the train back to work. He doesn't waste time waiting at the stop and arrives on time.

3. Evening: After work Marcus wants to meet his girlfriend at Zurich HB, ready to go for a concert in Winterthur. His phone warns him that the next train about to arrive is full of people, but there is another one in 10 minutes that should be quieter. Since they are not in a rush and would enjoy a more comfortable ride, they wait for the next train, where there are plenty of seats. Once they arrive in Winterthur, they take the bus to the concert. Since neither of them are familiar with the buses there, they panic and think they have taken the bus in the wrong direction, but fortunately Marcus can check his phone and determine which bus he is on from the location. Marcus can confirm they took the right one.

After enjoying the concert they head back to Zurich. It starts raining, so Marcus's phone directs them to a bus stop with a shelter nearby. Both of them are tired after a long day and fall asleep on the train. Fortunately, Marcus's phone knows when they are about to reach the station and an alarm sounds to wake them up.

XII. Conclusion

The Summary and Abstract sections may set forth one or more but not all exemplary embodiments as contemplated by the inventors, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

The claims in the instant application are different than those of the parent application or other related applications. Arguments made in a related application should not be read into the instant application.

What is claimed is:

1. A method for providing transportation information, comprising:
    receiving public transportation data including real-time vehicle location information and at least one of historical real-time vehicle location information or scheduled vehicle location information;
    determining whether the real-time vehicle location information deviates from at least one of historical real-time vehicle location information or scheduled vehicle location information;
    generating a schedule degradation mode based on a deviation of real-time vehicle location information from at least one of historical real-time vehicle location information or scheduled vehicle location information;
    generating first scheduling information for a user based on user data and public transportation data when the deviation does not exceed a threshold; and
    generating second scheduling information, different from the first scheduling information, that includes an indication of the schedule degradation mode for the user based on user data, public transportation data, and the deviation when the deviation exceeds the threshold.

2. The method of claim 1, further comprising:
    displaying first scheduling information to the user when the first scheduling information is generated; and
    displaying second scheduling information to the user that indicates timing of the second scheduling information corresponds to the degradation mode and further indicates that the second scheduling information is computed based on approximate scheduling times when the second scheduling information is generated.

3. The method of claim 1, wherein the schedule degradation mode indicates that real-time service is running with high precision according to at least one of scheduled vehicle location information or historical real-time vehicle location information.

4. The method of claim 1, wherein the schedule degradation mode indicates that real-time service significantly deviates from at least one of scheduled vehicle location information or historical real-time vehicle location information.

5. The method of claim 1, wherein the schedule degradation mode indicates that real-time service is inconsistent with at least one of scheduled vehicle location information or historical real-time vehicle location information, and further indicates an approximate frequency of vehicles.

6. The method of claim 5, wherein generating second scheduling information includes generating a route based on a current time and using the approximate frequency of vehicles as an expected wait time.

7. The method of claim 1, wherein the second scheduling information is computed based on approximate times, the method further comprising:
    computing a confidence interval based on the computed approximate times; and
    displaying the confidence interval to the user.

8. The method of claim 1, further comprising:
    generating an alert associated with a schedule degradation mode, the alert informing a user of a service disruption.

9. The method of claim 8, wherein generating the alert is dependent on schedule adherence.

10. A system for providing transportation information, comprising:
    a rider analyzer configured to receive public transportation data including real-time vehicle location information and at least one of historical real-time vehicle location information or scheduled vehicle location information;
    a public transportation analyzer configured:
    (i) to determine whether the real-time vehicle location information deviates from at least one of historical real-time vehicle location information or scheduled vehicle location information, and
    (ii) to generate a schedule degradation mode based on a deviation of real-time vehicle location information from at least one of historical real-time vehicle location information or scheduled vehicle location information; and
    a routing engine implemented on a computing device and configured:
    (i) to generate first scheduling information for a user based on user data and public transportation data when the deviation does not exceed a threshold, and
    (ii) to generate second scheduling information, different from the first scheduling information, that includes an indication of the schedule degradation mode for the user based on user data, public transportation data, and the deviation when the deviation exceeds the threshold.

11. The system of claim 10, wherein the second transportation information is at least one of transportation schedule information or historical transportation information.

12. The system of claim 10, wherein the routing engine is further configured to display the generated scheduling information.

13. The system of claim 12, wherein the routing engine is further configured to alter an appearance of scheduling information based on the degradation mode.

14. The system of claim 10, wherein the public transportation analyzer indicates a level of deviation from the schedule.

15. The system of claim 10, wherein the routing engine is further configured to provide relevant public transportation route segments based on public transportation data, user data, a user profile, and the degradation mode.

16. The system of claim 10, wherein the rider analyzer is further configured to provide an updated user profile based on public transportation data, user data, a user profile, and the degradation mode.

17. The system of claim 10, wherein, the public transportation analyzer is further configured to analyze at least one of real-time public transportation vehicle location information, public transportation scheduling information, historical public transportation vehicle location information, public transportation stations, public transportation lines, or public transportation available trips.

18. An apparatus comprising at least one non-transitory computer readable storage medium encoding instructions thereon that, in response to execution by a computing device, cause the computing device to perform operations comprising:

receiving public transportation data including real-time vehicle location information and at least one of historical vehicle location information or scheduled vehicle location information;

determining whether the real-time vehicle location information deviates from the at least one of historical vehicle location information or scheduled vehicle location information;

generating a schedule degradation mode based on the deviation of real-time vehicle location information from at least one of scheduled vehicle location information or historical real-time vehicle location information when the deviation exceeds a threshold;

generating first scheduling information for a user based on the user data and public transportation data when the deviation does not exceed a threshold; and generating second scheduling, information, different from the first scheduling information, that includes an indication of the schedule degradation mode for a user based on user data, public transportation data, and the deviation.

19. The apparatus of claim 18, the operations further comprising:

displaying first scheduling information when the first scheduling information is generated; and displaying second scheduling information when the second scheduling information is generated, the displayed second scheduling information being displayed differently from the first scheduling information.

20. The apparatus of claim 18, the operations further comprising:

alerting a user based on the schedule degradation mode.

\* \* \* \* \*